Patented Dec. 26, 1950

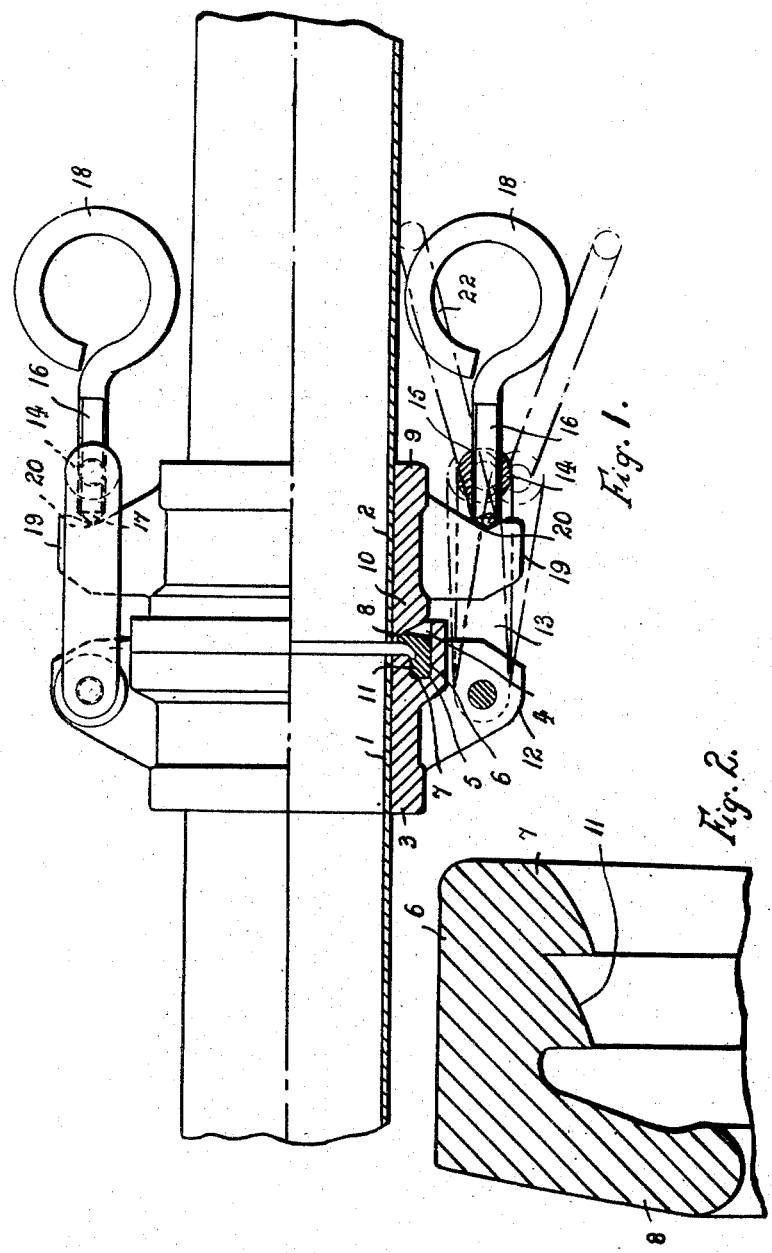

2,535,816

UNITED STATES PATENT OFFICE 2,535,816

COUPLING FOR PIPES AND OTHER TUBULAR ELEMENTS

Miroslav Sigmund, Gosforth, England

Application December 9, 1947, Serial No. 790,465
In Great Britain September 27, 1945

Section 1, Public Law 690, August 8, 1946
Patent expires September 27, 1965

3 Claims.  (Cl. 285—172)

The present invention relates to improvements in and relating to couplings for connecting pipes and other tubular elements, the object being to provide a coupling which is liquid or fluid tight and which offers a limited degree of flexibility without leakage.

The coupling according to the invention is of particular utility for example in connection with land irrigation systems in which water is pumped or distributed through pipe lines which require to be moved frequently for the purpose of irrigating different areas from the same source, or by selection from different points on one or more water mains.

The improved coupling according to the invention consists of a spigot and a socket, a sealing ring of rubber or like impervious elastic material of approximately L-shape in cross-section adapted to be located with one limb of the L in an annular recess provided in the bottom of the socket and the other limb projecting radially inwards of the socket and lying between the part of the bottom of the socket on the inner side of the annular recess and the end of the spigot, and means to urge the spigot with pressure into the socket, the arrangement being such that the end of the spigot makes first engagement with an inner part of the said inwardly projecting limb of the ring.

The end of the spigot may be tapered or backed-off and arranged to make first contact with the inwardly projecting limb of the elastic ring over a continuous band of limited width at or near the inner periphery thereof as the spigot is urged into the socket.

The inner side of the limb of the ring which engages in the recess in the socket may be serrated to form one or more annular grooves the ridges of which make continuous contact with the wall of the recess. For example, the sectional form of that side of the ring may be of "saw-tooth" form with the side of the tooth or teeth towards the spigot in a plane or planes normal to the axis of the socket.

With a sealing ring of such form, as the limb contacted by the spigot is deformed by pressure, the deformation of the other limb is such as to urge the ridges of the other limb more firmly into engagement with the wall of the recess. The pressure of water on the sealing ring urges the one limb into close contact with the end of the spigot and the ridges towards the wall of the recess.

The spigot is shaped so as to be capable of limited rocking movement relatively to the socket as may be necessary when the pipes to be joined cannot be arranged in axial alignment and a sealing ring of the form described above is capable of accommodating itself to such rocking movements whilst maintaining the water seal.

The improved coupling may also include quick engagement and release means in the form of two or more toggle action linkages pivotally carried on one of the spigot and socket elements to be joined and adapted to be engaged with the other element and to be manipulated by hand to make or break down the sealed joint.

Usually two such linkages are employed mounted on diametrically opposite sides of the socket or spigot element.

The invention is illustrated by way of example in the accompanying drawing, in which Fig. 1 shows an assembled coupling partly in section and Fig. 2 shows in section and on a larger scale a part of a sealing ring.

In the drawings, 1 and 2 represent the ends of two pipes to be joined. On the end of pipe 1 is welded or otherwise mounted a joint element 3 socketed as shown at 4 and provided in the bottom of the socket and around the pipe end, with an annular recess 5. In the socket 4 is mounted a rubber ring 6 of approximately L shape in section, one limb 7 of the L engaging in the annular recess 5 and the other limb 8 extending inwards beyond the recess 5 towards the pipe axis.

On the end of pipe 2 is welded or otherwise mounted the other joint element 9 forming the spigot, the entry end thereof being bevelled or backed-off as shown at 10 for engagement of the spigot end with the limb 8 of the rubber ring 6 over a continuous band of limited width at or near the inner periphery thereof while the sealing ring is in the substantially undeformed condition.

The inner side of the limb 7 of ring 6 is of saw-tooth form in section as shown at 11, the continuous ridges of the teeth being in close contact with the wall of the recess 5. The sides of the teeth away from the spigot 9 are steeply inclined whilst the other sides are at a lesser inclination or in planes approximately normal to the axis of the socket 3.

On opposite sides of the socket 3 are provided outwardly extending lugs 12 to which are pivoted pairs of bars 13 the other ends of which are connected by a block 14 rotatable in the bars 13, said block being provided with a screw-threaded diametrically disposed bore 15. A screwed rod 16 tapered at one end 17 and provided with a handle 18 at the other is screwed into bore 15.

The spigot 9 is also provided on opposite sides with lugs 19 recessed as shown at 20, the distance of the recesses 20 from the axis of the spigot being somewhat greater than the distance of the pivotal axis of the bars 13 on lugs 12 from the axis of the socket.

In the operation of joining the pipe ends as shown, with the sealing ring 6 in position in recess 5 in socket 3, the spigot 9 is brought into register with the socket entrance and into engagement with limb 8 of the sealing ring 6 and the linkages on socket 3 moved to bring the tapered ends 17 of the rods 16 into the recesses 20 in the lugs 19 on the spigot the rod 16 then being in the position shown in dotted lines at 21 in Fig. 1 of the drawing.

The rods 16 are adjusted in the blocks by screwing, with the aid of the handles 18 and thereafter the rods 16 are swung inwards past the dead centre position to the position shown at 22 in Fig. 1, to urge the spigot end against the limb 8 of the sealing ring 6. In this position the handles rest against pipe 2 and the joint is maintained until the handles are rocked subsequently in the reverse direction to break the joint. By varying the adjustment of the two linkages, the relative alignment of the pipes may be varied to a limited extent, the sealing ring being deformed to a greater extent on one side than the other. The ring may be deformed by the pressure of the spigot to a greater extent than is shown diagrammatically in Fig. 1 of the drawings and the limb 8 of the ring may be, but is not necessarily urged into contact with the bottom of the socket, for it will readily be seen that with the arrangement shown, pressure of the water or other fluid is exerted in the angle between the limbs of the ring, so that the limb 8 is pressed thereby against the end of the spigot whilst the ridges on limb 7, already urged against the wall of recess 5 by the resilience of the deformed ring, are still further pressed in that direction by the water pressure.

It will be understood that the joint described is well adapted for use in joining other tubular elements than pipes and that other means than the linkages described may be employed for urging together the members to be joined.

I claim:

1. A coupling for connecting pipes and other tubular elements, comprising a taper-ended spigot, a socket having an internal axially directed annular recess in the bottom wall thereof, a sealing ring of impervious elastic material comprising an axially directed portion and a flange portion extending radially inwards from one end of said axially directed portion, said sealing ring being adapted to seat within the socket with the free end of the axially directed portion within the axially directed annular recess in the bottom wall of the socket and the inwardly directed flange portion lying between the part of the bottom wall of the socket on the radially inner side of the axially directed annular recess and the extremity of the tapered end of the spigot, and means to urge the spigot into the socket, the arrangement being such that the tapered end of the spigot makes first contact with the sealing ring on a continuous band of its surface near the inner periphery of the radially inwardly projecting portion thereof.

2. A coupling for connecting pipes and other tubular elements, comprising a taper-ended spigot, a socket having an internal axially directed annular recess in the bottom wall thereof, a sealing ring of impervious elastic material comprising an axially directed portion and a flange portion extending radially inwards from one end of said axially directed portion, continuous circumferential ridges of saw tooth form in section on the inner side of said axially directed portion, the sides of said ridges towards the radially inwardly projecting portion of the sealing ring lying in planes approximately normal to the axis of the sealing ring, said sealing ring being adapted to seat within the socket with the free end of the axially directed portion within the axially directed annular recess in the bottom wall of the socket, the circumferential ridges on said axially directed portion in contact with the radially inner wall of said annular recess and the inwardly directed flange portion lying between the part of the bottom wall of the socket on the radially inner side of the axially directed annular recess and the extremity of the tapered end of the spigot, and means to urge the spigot into the socket, the arrangement being such that the tapered end of the spigot makes first contact with the sealing ring on a continuous band of its surface near the inner periphery of the radially inwardly projecting portion thereof.

3. A coupling for connecting pipes and other tubular elements, comprising a taper-ended spigot, a socket having an internal annular recess in the bottom wall thereof, a sealing ring of impervious elastic material including an axially directed portion and a flange portion extending radially inwards from one end of said axially directed portion, said sealing ring being adapted to seat within the socket with the free end of the axially directed portion within the annular recess in the bottom wall of the socket and the inwardly directed flange portion lying between the part of the bottom wall of the socket on the radially inner side of the annular recess and the extremity of the tapered end of the spigot, and means to urge the spigot with pressure into the socket, including pairs of parallel bars pivotally mounted at one end on one of the members to be connected, internally screwed sleeves pivotally mounted between the free ends of said pairs of parallel bars and longitudinally adjustable screwed rods engaging in said internally screwed sleeves so as to form toggle linkages with said bars, and projections on the other member to be joined constituting abutments for engagement by the ends of the screwed rods nearest the points of pivotal connection of the pairs of parallel bars with one of the members to be joined, the arrangement being such that the tapered end of the spigot makes first contact with the sealing ring on a continuous band of its surface near the inner periphery of the radically inwardly projecting portion thereof.

MIROSLAV SIGMUND.

REFERENCES CITED

The following references are of record in the file of this patent:

UNITED STATES PATENTS

| Number | Name | Date |
|---|---|---|
| 707,991 | Wareham | Aug. 26, 1902 |
| 1,985,325 | Nathan | Dec. 25, 1934 |
| 1,991,343 | Ball | Feb. 12, 1935 |
| 1,992,503 | Penick et al. | Feb. 26, 1935 |
| 2,116,705 | Marz et al. | May 10, 1938 |
| 2,268,456 | Meyer | Dec. 30, 1941 |

FOREIGN PATENTS

| Number | Country | Date |
|---|---|---|
| 29,975 | Australia | Nov. 5, 1930 |
| 61,978 | Norway | Jan. 26, 1940 |